Dec. 23, 1952 A. FRIEDERICH 2,623,155
PROCESS AND DEVICE FOR MELTING PREFERABLY ORGANIC
PRODUCTS IN AN ALTERNATING HIGH-FREQUENCY FIELD
Filed Sept. 20, 1949
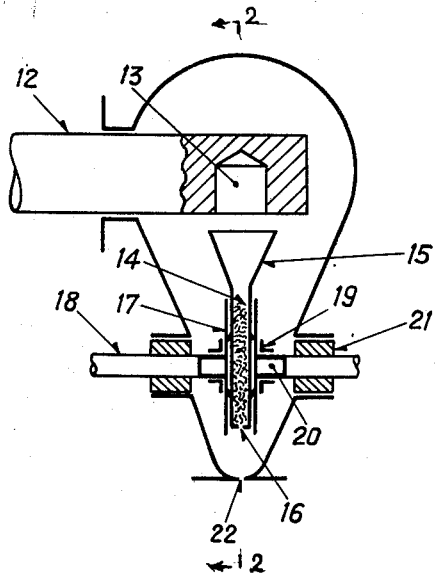
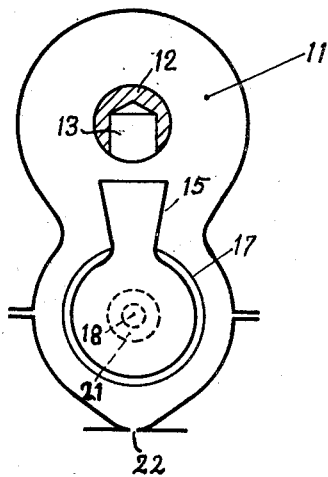
INVENTOR:
Alfred Friederich
BY
ATTORNEYS Patented Dec. 23, 1952

2,623,155

UNITED STATES PATENT OFFICE 2,623,155

PROCESS AND DEVICE FOR MELTING PREFERABLY ORGANIC PRODUCTS IN AN ALTERNATING HIGH-FREQUENCY FIELD

Alfred Friederich, Stuttgart, Germany, assignor to Phrix-Werke Aktiengesellschaft, Hamburg, Germany, a German corporation Application September 20, 1949, Serial No. 116,768
In Switzerland September 25, 1948

3 Claims. (Cl. 219—47)

In patent application Ser. No. 116,767, filed concurrently herewith, now abandoned, a process and device have been described by means of which preferably organic products in small, solid pieces are periodically charged into a melting chamber and there liquefied by the application of heat. Since the substances in question are in more or less every case non-conductors of electricity, they admit of being very conveniently heated, under conditions of considerable saving of time, in an alternating electric high-frequency field. For this purpose the present process and the device described hereunder are advantageously employed.

A non-metallic container of suitable shape and of dimensions adapted to the output desired is periodically charged with a measured volume of a solid product reduced to small pieces and then exposed between two preferably disc-shaped electrodes to the alternating high-frequency field and its contents heated by the action thereof.

After the melting point has been reached, the liquid formed sinks down the walls of the containers and is discharged through an aperture in the bottom of the melting chamber, thus proceeding beyond the range of the electrical field.

During the melting process the walls of the container are so heated to such a temperature that when the next charge is introduced difficulties are sometimes caused by the fact that particles or grains adhere to the walls. It is therefore expedient to cool the walls of the container to at least below the melting temperature of the solid product by allowing a stream of air or gas to play upon it between two charge cycles.

A device used for this process is illustrated in Figs. 1 and 2 in longitudinal and cross-sectional view respectively. In these figures, as in the aforesaid co-pending application, 11 denotes the closed melting chamber into which the product to be melted is periodically fed, in small pieces, by means of the piston 12, said product being located in a recess 13 of said piston. In the position illustrated the charging space 13 has already been emptied by downward rotation of the piston through 180°. It has been emptied into a flat cylindrical container 14 which is tapered outward at its top to form a funnel-shaped head 15 enabling the interior to be conveniently filled. The material of the container is an electrical non-conductor, such as glass, stoneware, or porcelain. Thus, the non-conducting material of the container has the highest possible dielectric constant and a small angle of loss. At its lowest point the container 14 provided with one or a plurality of circular or slot-shaped openings 16 which are so dimensioned in relation to the grain-size of the solid product that they permit the fluid to pass whilst retaining the particles of the solid product. Opposite the two end walls of the container 14 disc electrodes 17 are arranged at equal, small distances from the wall of the container, between which electrodes the alternating electrical field of high (radio) frequency pulsates.

The electrical tension is supplied to these electrodes by metal tubes 18 which are connected to said electrodes by means for instance of angle rings 19. On both sides, bosses 20 of the containers 14 project into the ends of the pipes 18, by which means the said container is at the same time centered and supported, a convenient safeguard against any rotation of the container about its horizontal axis being obtained by, for instance, making the bosses 20 and the pipe ends 18 of square instead of round shape. The feed pipes 18 are insulated by porcelain bushes 21 at the point where they pierce the metallic casing of the melting chamber 11.

The melted fluid gathers at the bottom of the melting chamber 11 from which it is discharged through the aperture 22.

The process above described and the appurtenant device can advantageously be used for all products—preferably synthetic organic materials—which are enumerated in the specification of the aforesaid application, that is to say in particular for high polymers of the polyamide, polyethylene, polyvinyl, polystyrene groups and the derivatives of polyacrylic acid in which connection the substances of the same group may be present either alone or in any suitable ratio of mixture. The presence of other solid organic or inorganic substances is possible according to the invention, which substances may either react with the main product during the actual melting process or participate as mechanical admixtures only.

I claim:

1. A melting device, compriisng means forming a melting chamber, a piston slidably mounted in said melting chamber and sealing off the melting chamber against the atmosphere, said piston having a filling space formed therein to take up the product to be melted, means rotatably supporting said piston to cause the piston to discharge the product to be melted into the melting chamber, a funnel-shaped head in said chamber for receiving the product to be melted, a cylindrical container below said funnel-shaped head, two disk-shaped electrodes, said container being arranged between said two disk-shaped electrodes and having an opening formed therein for the melted product, and means forming a collecting chamber communicating with said opening to take up the melted material, said collecting chamber having an aperture formed therein at the lowest point for discharging the melted material.

2. A device as claimed in claim 1, characterized by the fact that the container is suspended in the ends of tubular metallic conductors of the electric current by means of two bosses.

3. A device as claimed in claim 2, characterized by the fact that the tubular feed conductors are insulated from the wall of the melting chamber by porcelain bushes.

ALFRED FRIEDERICH.

REFERENCES CITED

The following references are of record in the file of this patent:

UNITED STATES PATENTS

| Number | Name | Date |
| --- | --- | --- |
| 1,930,169 | Halvorson et al. | Oct. 10, 1933 |
| 2,188,625 | Dufour et al. | Jan. 30, 1940 |
| 2,411,254 | Frank | Nov. 19, 1946 |
| 2,489,135 | Himmel et al. | Nov. 22, 1949 |
| 2,505,602 | Bertrand | Apr. 25, 1950 |
| 2,542,028 | Hodge | Feb, 20, 1951 |